(12) United States Patent
Hou et al.

(10) Patent No.: US 9,489,469 B2
(45) Date of Patent: Nov. 8, 2016

(54) PAGE DISPLAY METHOD, APPARATUS AND TERMINAL

(71) Applicant: TENCENT TECHNOLOGY (SHENZHEN) COMPANY LIMITED, Shenzhen (CN)

(72) Inventors: Jie Hou, Shenzhen (CN); Ningjun Dou, Shenzhen (CN); Wenjun Gao, Shenzhen (CN); Yi Zhao, Shenzhen (CN); Fang Fang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/549,110

(22) Filed: Nov. 20, 2014

(65) Prior Publication Data

US 2015/0082379 A1    Mar. 19, 2015

Related U.S. Application Data

(63) Continuation of application No. PCT/CN2013/076861, filed on Jun. 6, 2013.

(30) Foreign Application Priority Data

Jun. 6, 2012 (CN) .......................... 2012 1 0183636

(51) Int. Cl.
*G06F 17/00* (2006.01)
*G06F 12/14* (2006.01)
(Continued)

(52) U.S. Cl.
CPC ....... *G06F 17/3089* (2013.01); *G06F 17/2247* (2013.01); *G06F 17/30899* (2013.01);
(Continued)

(58) Field of Classification Search
CPC ............... H04L 63/20; H04L 63/1416; G06F 21/6218; G06F 9/4446; G06F 3/0481; G06F 3/04895

USPC .................... 726/1, 22; 715/705, 715
See application file for complete search history.

(56) References Cited

U.S. PATENT DOCUMENTS 8,042,060 B1    10/2011  Djabarov et al.
2009/0171930 A1*  7/2009  Vaughan ........... G06F 17/30876
(Continued)

FOREIGN PATENT DOCUMENTS

| CN | 101807193 A | 8/2010 |
|---|---|---|
| CN | 101968838 A | 2/2011 |
| JP | 2012-032914 A | 2/2012 |

OTHER PUBLICATIONS

Office Action dated Dec. 31, 2014, in Chinese Patent Application No. 201210183636.5 (with English Abstract).
(Continued)

*Primary Examiner* — Aravind Moorthy
(74) *Attorney, Agent, or Firm* — Oblon, McClelland, Maier & Neustadt, L.L.P.

(57) ABSTRACT

The embodiments of the disclosure provide a page display method and apparatus, belonging to the field of terminals. The method comprises monitoring the page browsing mode of a browser while running the browser; determining a changed page browsing mode, if the page browsing mode of the browser is changed; and displaying a tips button on the current page of the browser, if the changed page browsing mode is a specified mode. The apparatus comprises a monitoring module, a determining module, and a displaying module. Thereby, the tips-making process while switching modes is simplified. The tips button is displayed on a specific location to remind users, without breaking the continuous browsing via the browser, so that non-trace switch can be achieved when the browser changes its page browsing mode.

8 Claims, 7 Drawing Sheets

(51) Int. Cl.

| | | |
|---|---|---|
| *G06F 3/00* | (2006.01) | |
| *G06F 3/048* | (2013.01) | |
| *G06F 17/30* | (2006.01) | |
| *G06F 17/22* | (2006.01) | |
| G06F 9/44 | (2006.01) | |
| G06F 3/0481 | (2013.01) | |
| H04L 29/06 | (2006.01) | |
| G06F 3/0489 | (2013.01) | |
| G06F 21/62 | (2013.01) | |

(52) U.S. Cl.
CPC ............ H04L63/20 (2013.01); *G06F 3/0481* (2013.01); *G06F 3/04895* (2013.01); *G06F 9/4446* (2013.01); *G06F 21/6218* (2013.01); *H04L 63/1416* (2013.01)

(56) References Cited

U.S. PATENT DOCUMENTS

| 2012/0191744 | A1* | 7/2012 | Kim | .................... | G06F 17/3097 |
| | | | | | 707/767 |
| 2012/0240237 | A1* | 9/2012 | Kanevsky | ......... | G06F 17/30899 |
| | | | | | 726/26 |
| 2012/0304292 | A1* | 11/2012 | Liu | ......................... | H04L 61/30 |
| | | | | | 726/22 |
| 2012/0323898 | A1* | 12/2012 | Kumar | ............. | G06F 17/30867 |
| | | | | | 707/723 |
| 2013/0013750 | A1* | 1/2013 | Butler | .................... | H04L 67/28 |
| | | | | | 709/219 |
| 2013/0019159 | A1* | 1/2013 | Civelli | ............. | G06F 17/30902 |
| | | | | | 715/234 |

OTHER PUBLICATIONS

Tu, Zhicheng, Give you a safe browser, Computer Fan (popular version), Oct. 2008, No. 10, pp. 31-32—English abstract only, reference previously filed on Nov. 20, 2015.
International Search Report mailed Sep. 19, 2013 for PCT/CN2013/076861 filed Jun. 6, 2013 with English Translation.
International Written Opinion mailed Sep. 19, 2013 for PCT/CN2013/076861 filed Jun. 6, 2013.
Tu, Zhicheng, Give you a safe browser, Computer Fan (popular version), Oct. 2008, No. 10, pp. 31-32.

\* cited by examiner

PAGE DISPLAY METHOD, APPARATUS AND TERMINAL

CROSS REFERENCE TO RELATED APPLICATIONS

This application is a continuation of International Application No. PCT/CN2013/076861, filed on Jun. 6, 2013, which claims priority to Chinese Patent Application No. 201210183636.5, filed on Jun. 6, 2012, both of which are hereby incorporated by reference in their entireties.

FIELD OF THE INVENTION

The invention relates to terminal devices, particularly to a page display method, an apparatus and a terminal.

BACKGROUND

When a user is browsing a web page via a browser on a client, such as a mobile terminal, he/she may require the browser in a certain browsing mode, such as traceless browsing mode or security protection mode. Then pop-up control for tips, such as Toast will be used. Toast is a very handy tips message box, which may generate a simple message for the user on the browser client interface. Usually the message is displayed in the center of the screen.

The conventional technology has some issues. Although the pop-up control is a weak reminder, it is not a system control. Hence, when, for example, the user continuously switches between different browsing modes, the pop-up control will repeatedly provide message tips. For example again, the user continuously open multiple tabs with each in a different browsing state. The pop-up control will provide message tips for each of the tabs. The tips message box of the pop-up control will be displayed for a period of time, which can interrupt the user from browsing through the browser.

SUMMARY OF THE INVENTION

The embodiments of the disclosure provide a page display method, an apparatus and a terminal to maintain the continuity when browsing through the client browser.

At an aspect, a page display method is provided, comprising:

monitoring the page browsing mode of a browser while running the browser;

determining a changed page browsing mode, if the page browsing mode of the browser is changed; and displaying a tips button on the current page of the browser, if the changed page browsing mode is a specified mode.

Preferably, the specified mode includes a traceless browsing mode and a security browsing mode, and the step of displaying a tips button on the current page of the browser, if the changed page browsing mode is a specified mode comprises:

displaying a tips button for the traceless browsing mode on the current page of the browser, if the changed page browsing mode is the traceless browsing mode; and displaying a tips button for the current page on the current page of the browser according to the current page of the browser and the browsing rule of the security browsing mode, if the changed page browsing mode is the security browsing mode.

Preferably the step of displaying a tips button for the current page on the current page of the browser according to the current page of the browser and the browsing rule of the security browsing mode, if the changed page browsing mode is the security browsing mode, comprises:

judging whether the web address of the current page is in a blacklist or a whitelist of the browsing rule according to the browsing rule of the security browsing mode, if the changed page browsing mode is the security browsing mode;

displaying a tips button for representing security on the current page of the browser, if the web address of the current page is in the whitelist of the browsing rule;

displaying a tips button for representing insecurity on the current page of the browser, if the web address of the current page is in the blacklist of the browsing rule; and displaying a tips button for representing unknown security on the current page of the browser, if the web address of the current page is neither in the blacklist of the browsing rule nor in the whitelist of the browsing rule.

Preferably, the method further comprises:

displaying a information box including description information of the specified mode, when displaying a tips button on the current page of the browser; and hiding the information box, if receiving a click operation outside the information box.

Preferably, the step of displaying a tips button on the current page of the browser, if the changed page browsing mode is a specified mode comprises:

displaying the tips button on the current page of the browser and providing tips through a pop-up control, if the page browsing mode of the browser is changed to the specified mode for the first time.

At another aspect, a page display apparatus is provided, comprising:

monitoring module, for monitoring the page browsing mode of a browser while running the browser;

determining module, for determine a changed page browsing mode, if the page browsing mode of the browser is changed; and displaying module, for displaying a tips button on the current page of the browser, if the determining module determines the page browsing mode of the browser is changed to a specified mode.

Preferably, the specified mode comprises a traceless browsing mode and a security browsing mode, and the displaying module comprises:

a first displaying unit for displaying a tips button for the traceless browsing mode on the current page of the browser, if the changed page browsing mode is the traceless browsing mode; and a second displaying unit for displaying a tips button for the current page on the current page of the browser according to the current page of the browser and the browsing rule of the security browsing mode, if the changed page browsing mode is the security browsing mode.

Preferably, the second displaying unit comprises:

a judging unit for judging whether the web address of the current page is in a blacklist or a whitelist of the browsing rule according to the browsing rule of the security browsing mode, if the changed page browsing mode is the security browsing mode;

a displaying sun-unit for displaying a tips button for representing security on the current page of the browser, if the web address of the current page is in the whitelist of the browsing rule;

the displaying sun-unit for displaying a tips button for representing insecurity on the current page of the browser, if the web address of the current page is in the blacklist of the browsing rule; and the displaying sun-unit for displaying a tips button for representing unknown security on the current page of the browser, if the web address of the current page is neither in the blacklist of the browsing rule nor in the whitelist of the browsing rule.

Preferably, the displaying module is further configured to display a information box including description information of the specified mode, when displaying a tips button on the current page of the browser; and hide the information box, if receiving a click operation outside the information box.

Preferably, the displaying module is further configured to display the tips button on the current page of the browser and provide tips through a pop-up control, if the page browsing mode of the browser is changed to the specified mode for the first time.

At another aspect, a terminal device is provided, wherein the terminal device comprises the page display apparatus of the above.

At another aspect, a terminal device is provided, wherein terminal comprises:

a memory; and one or more programs, stored in the memory and configured to be executed by one or more processors, the one or more programs comprising instructions used to perform the following operations:

monitoring the page browsing mode of a browser while running the browser;

determining a changed page browsing mode, if the page browsing mode of the browser is changed; and displaying a tips button on the current page of the browser, if the changed page browsing mode is a specified mode.

Preferably, the specified mode includes a traceless browsing mode and a security browsing mode, and the operation of displaying a tips button on the current page of the browser, if the changed page browsing mode is a specified mode comprises:

displaying a tips button for the traceless browsing mode on the current page of the browser, if the changed page browsing mode is the traceless browsing mode; and displaying a tips button for the current page on the current page of the browser according to the current page of the browser and the browsing rule of the security browsing mode, if the changed page browsing mode is the security browsing mode.

Preferably, the operation of displaying a tips button for the current page on the current page of the browser according to the current page of the browser and the browsing rule of the security browsing mode, if the changed page browsing mode is the security browsing mode, comprises:

judging whether the web address of the current page is in a blacklist or a whitelist of the browsing rule according to the browsing rule of the security browsing mode, if the changed page browsing mode is the security browsing mode;

displaying a tips button for representing security on the current page of the browser, if the web address of the current page is in the whitelist of the browsing rule;

displaying a tips button for representing insecurity on the current page of the browser, if the web address of the current page is in the blacklist of the browsing rule; and displaying a tips button for representing unknown security on the current page of the browser, if the web address of the current page is neither in the blacklist of the browsing rule nor in the whitelist of the browsing rule.

Preferably, the instructions further comprise:

displaying a information box including description information of the specified mode, when displaying a tips button on the current page of the browser; and hiding the information box, if receiving a click operation outside the information box.

Preferably, the operation of displaying a tips button on the current page of the browser, if the changed page browsing mode is a specified mode comprises:

displaying the tips button on the current page of the browser and providing tips through a pop-up control, if the page browsing mode of the browser is changed to the specified mode for the first time.

At another aspect, a computer-readable storage medium is provided, wherein one or more programs are stored in the computer-readable storage medium and executed by one or more processors to perform a page display method, and the method comprises:

monitoring the page browsing mode of a browser while running the browser;

determining a changed page browsing mode, if the page browsing mode of the browser is changed; and displaying a tips button on the current page of the browser, if the changed page browsing mode is a specified mode.

Preferably, the specified mode includes a traceless browsing mode and a security browsing mode, and the step of displaying a tips button on the current page of the browser, if the changed page browsing mode is a specified mode comprises:

displaying a tips button for the traceless browsing mode on the current page of the browser, if the changed page browsing mode is the traceless browsing mode; and displaying a tips button for the current page on the current page of the browser according to the current page of the browser and the browsing rule of the security browsing mode, if the changed page browsing mode is the security browsing mode.

Preferably, the step of displaying a tips button for the current page on the current page of the browser according to the current page of the browser and the browsing rule of the security browsing mode, if the changed page browsing mode is the security browsing mode, comprises:

judging whether the web address of the current page is in a blacklist or a whitelist of the browsing rule according to the browsing rule of the security browsing mode, if the changed page browsing mode is the security browsing mode;

displaying a tips button for representing security on the current page of the browser, if the web address of the current page is in the whitelist of the browsing rule;

displaying a tips button for representing insecurity on the current page of the browser, if the web address of the current page is in the blacklist of the browsing rule; and displaying a tips button for representing unknown security on the current page of the browser, if the web address of the current page is neither in the blacklist of the browsing rule nor in the whitelist of the browsing rule.

Preferably, the method further comprises:

displaying a information box including description information of the specified mode, when displaying a tips button on the current page of the browser; and hiding the information box, if receiving a click operation outside the information box.

Preferably, the step of displaying a tips button on the current page of the browser, if the changed page browsing mode is a specified mode comprises:

displaying the tips button on the current page of the browser and providing tips through a pop-up control, if the page browsing mode of the browser is changed to the specified mode for the first time.

According to the page display method, apparatus and terminal of exemplary embodiments of the present invention, it is to monitor the page browsing mode of a browser while running the browser, determine a changed page browsing mode, if the page browsing mode of the browser is changed, and display a tips button on the current page of the browser, if the changed page browsing mode is a specified mode. Thereby, the tips-making process while switching modes is simplified. The tips button is displayed on a specific location to remind users, without breaking the continuous browsing via the browser, so that non-trace switch can be achieved when the browser changes its page browsing mode.

DESCRIPTION OF THE DRAWINGS

In order to more clearly illustrate the technical solutions of the present embodiments of the invention, description will be made below in combination with the drawings. Apparently, the drawings described below illustrate only some embodiments of the present invention. For the skill in the art, other embodiments are also conceivable according to these drawings.

DETAILED DESCRIPTION

To clarify the purposes, solutions and advantages of the invention, the present invention will be described in further detail in conjunction with the following drawings.

It should be noted that, the page display method according to the embodiments of the present invention, can be performed by a page display apparatus, such as a browser. Alternatively, the page display method according to the embodiments of the present invention can be performed by a terminal device with the function of page display, such as the mobile terminal with the page display apparatus. The terminal can also be a fixed terminal. The fixed terminal can include PCs (Personal Computers) or display devices, and the mobile terminal can include smart phones, tablet PCs, MP3 (Moving Picture Experts Group Audio Layer III), PDA (Personal Digital Assistant) or the like. In the following embodiments of the invention, the page display apparatus is taken as an example for performing the page display method, such as a browser installed on a terminal.

Figure 1:
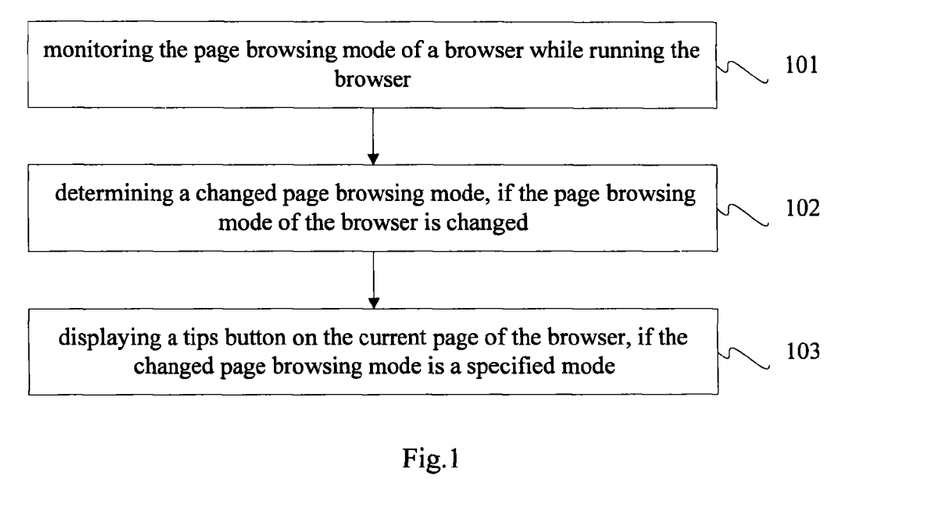
FIG. 1 is a flowchart of the page display method according to an exemplary embodiment of the present invention.

FIG. 1 is a flow chart of the page display method according to an exemplary embodiment of the present invention. As shown in FIG. 1, the method includes:

101, monitoring the page browsing mode of a browser while running the browser;

102, determining a changed page browsing mode, if the page browsing mode of the browser is changed; and 103, displaying a tips button on the current page of the browser, if the changed page browsing mode is a specified mode.

Optionally, the specified mode includes, for example, a traceless browsing mode or a security browsing mode. The step of displaying a tips button on the current page of the browser, if the changed page browsing mode is a specified mode includes:

displaying a tips button for the traceless browsing mode on the current page of the browser, if the changed page browsing mode is the traceless browsing mode; and displaying a tips button for the current page on the current page of the browser according to the current page of the browser and the browsing rule of the security browsing mode, if the changed page browsing mode is the security browsing mode.

Optionally, the step of displaying a tips button for the current page on the current page of the browser according to the current page of the browser and the browsing rule of the security browsing mode, if the changed page browsing mode is the security browsing mode, includes:

judging whether the web address of the current page is in a blacklist or a whitelist of the browsing rule according to the browsing rule of the security browsing mode, if the changed page browsing mode is the security browsing mode;

displaying a tips button for representing security on the current page of the browser, if the web address of the current page is in the whitelist of the browsing rule;

displaying a tips button for representing insecurity on the current page of the browser, if the web address of the current page is in the blacklist of the browsing rule; and displaying a tips button for representing unknown security on the current page of the browser, if the web address of the current page is neither in the blacklist of the browsing rule nor in the whitelist of the browsing rule.

Optionally, the method further includes:

displaying a information box including description information of the specified mode, when displaying a tips button on the current page of the browser; and hiding the information box, if receiving a click operation outside the information box.

Optionally, the step of displaying a tips button on the current page of the browser, if the changed page browsing mode is a specified mode includes:

displaying the tips button on the current page of the browser and providing tips through a pop-up control, if the page browsing mode of the browser is changed to the specified mode for the first time.

According to the page display method of exemplary embodiments of the present invention, it is to monitor the page browsing mode of a browser while running the browser, determine a changed page browsing mode, if the page browsing mode of the browser is changed, and display a tips button on the current page of the browser, if the changed page browsing mode is a specified mode. Thereby, the tips-making process while switching modes is simplified. The tips button is displayed on a specific location to remind users, without breaking the continuous browsing via the browser, so that non-trace switch can be achieved when the browser changes its page browsing mode.

Figure 2:
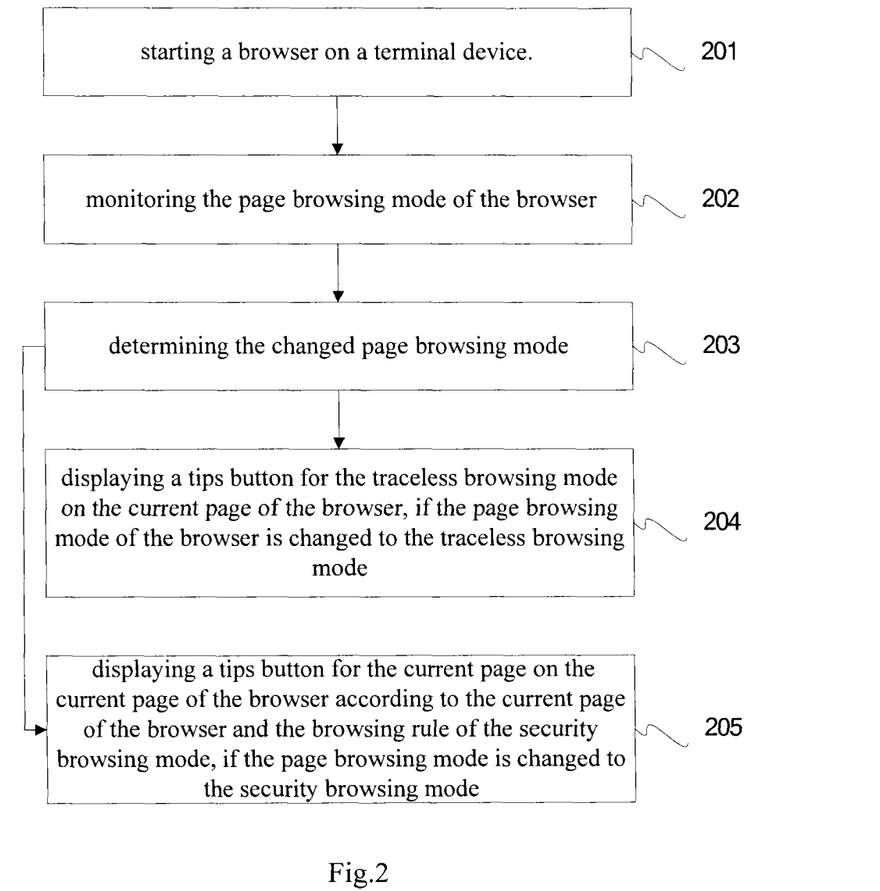
FIG. 2 is a flowchart of the page display method according to another exemplary embodiment of the present invention.

FIG. 2 is a flow chart of the page display method according to another exemplary embodiment of the present invention.

As shown in FIG. 2, at step 201, a browser is started on a terminal device.

The terminal can be a mobile terminal or a fixed terminal. The browser may be started by an icon calling the browser or by a network link, which is well known to the skilled in the art and will not to be described detailed here.

At step 202, the page browsing mode of the browser is monitored while running the browser.

The page browsing mode includes, for example, a common browsing mode, a traceless browsing mode or a security browsing mode.

In this embodiment, the monitoring is implemented by monitoring the plug-in associated with the page browsing mode. There is a variety of plug-ins associated with the page browsing mode. In this embodiment, a traceless browsing mode plug-in and a security browsing mode plug-in are taken as examples of the plug-ins. The traceless browsing mode plug-in corresponds to the traceless browsing mode. The traceless browsing mode refers to a mode for browsing the Internet without leaving any browsing record. The characteristics of the traceless browsing mode include mainly, for example, (1) leaving no traces on the Internet to protect user privacy; (2) leaving no Cookies; (3) leaving no Internet temporary files; (4) leaving no web form data (user name, password, search keywords, etc.); (5) leaving no record of access history; (6) leaving no revocation page list; and (7) the title bar always does not display the page title. The security browsing mode plug-in corresponds to the security browsing mode. The security browsing mode refers to a mode for browsing the Internet with risk judgment and protection to the browsed page. Specifically, the security browsing mode may include a full set of browsing solutions to identify websites intellectually according to the built-in blacklist and whitelist of the browser. The blacklist may directly prompt not to browse. The whitelist means normal browsing, but disabling the script and controls for websites with potential risk. The browsing can be ensured to be as safe as possible. The user can also choose the trusted website and add it to the whitelist to browse it normally next time.

In addition, the monitoring can also be implemented by monitoring the click of a button corresponding to the specified mode. When the button corresponding to the specified mode, such as the traceless browsing button, is clicked, it is monitored that the traceless browsing mode is activated. The same is also applicable to other modes.

At step 203, it is determined the changed page browsing mode, if the page browsing mode of the browser is changed.

Besides the traceless browsing mode, the page browsing mode includes, but not limited to, the easy mode, the filtering mode, etc. In this embodiment, tips are made only for browsing in the specified mode.

At step 204, a tips button for the traceless browsing mode is displayed on the current page of the browser, if the page browsing mode of the browser is changed to the traceless browsing mode.

If it is monitored that the traceless browsing mode plug-in is activated, that is to say, the page browsing mode of the browser is changed to the traceless browsing mode, the tips button for the traceless browsing mode is displayed on the current page of the browser.

Figure 3:
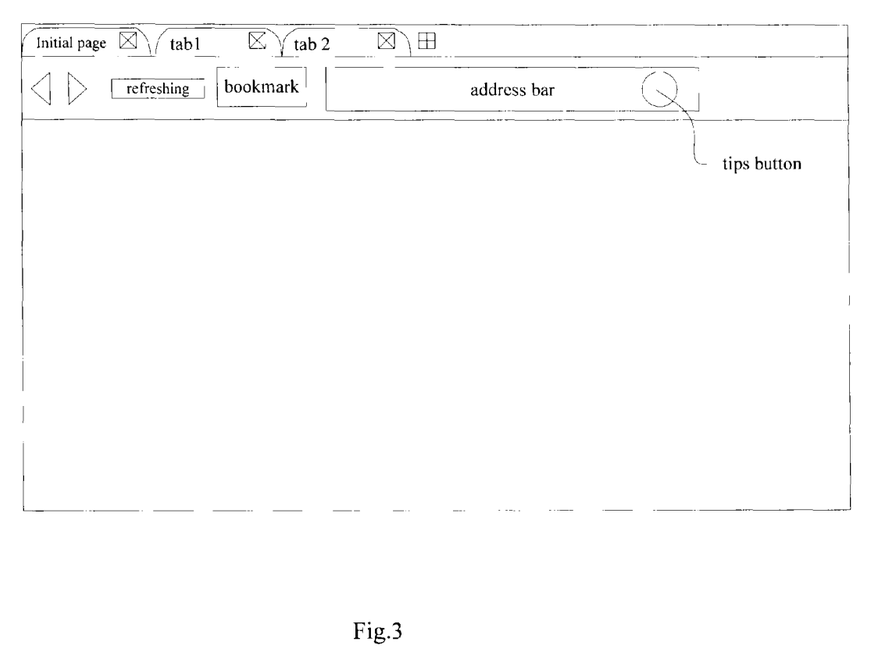
FIG. 3 is a schematic diagram of an interface according to an exemplary embodiment of the present invention.

FIG. 3 is a schematic diagram of an interface according to an exemplary embodiment of the present invention. As shown in FIG. 3, the tips button corresponding to the traceless browsing mode is located in the address bar. In other words, the tips button corresponding to the traceless browsing mode is displayed in a predetermined location in the address bar of the browser, for example, one end of the address bar. It should be noted that the shape and location of the tips button corresponding to the traceless browsing mode, shown in FIG. 3, are only examples. The tips button can also have other shapes, for example, rectangular or triangular, and can be located outside the address bar, for example, at the bottom right or bottom left corner of the browser and so on. Furthermore, the tips button can also provide other tips information, such as "in the traceless browsing mode" so that users can learn the current browsing mode.

At step 205, a tips button for the current page is displayed on the current page of the browser according to the current page of the browser and the browsing rule of the security browsing mode, if the page browsing mode is changed to the security browsing mode.

If it is monitored that the security browsing mode plug-in is activated, that is to say, the page browsing mode of the browser is changed to the security browsing mode, the tips button for the current page is displayed on the current page of the browser according to the current page of the browser and the browsing rule of the security browsing mode. Specifically, the browsing rule of the security browsing mode includes a blacklist and a whitelist. The blacklist includes unsafe websites to prompt not to browse. The whitelist includes safe websites to prompt it is safe to browse. It is to determine whether the web address of the current page is in the blacklist or the whitelist of the browsing rule according to the browsing rule of the security browsing mode, if the page browsing mode of the browser is changed to the security browsing mode; a tips button for representing security is displayed on the current page of the browser, if the web address of the current page is in the whitelist of the browsing rule; a tips button for representing insecurity is displayed on the current page of the browser, if the web address of the current page is in the blacklist of the browsing rule; and a tips button for representing unknown security is displayed on the current page of the browser, if the web address of the current page is neither in the blacklist of the browsing rule nor in the whitelist of the browsing rule.

It should be noted that the tips button for representing security of the page, the tips button for representing insecurity of the page and the tips button for representing unknown security of the page can be the same, except their color. For example, the tips button for representing security of the page may be green, the tips button for representing insecurity of the page may be red, and the tips button for representing unknown security of the page may be yellow. Of course, each button can also have other color.

It should be noted that, since the traceless browsing mode and the security browsing mode can co-exist, the page browsing mode of the browser is changed to the traceless browsing mode and the security browsing mode if it is monitored that both the traceless browsing mode plug-in and the security browsing mode plug-in are activated.

The method may further includes: displaying a information box including description information of the specified mode, when displaying a tips button on the current page of the browser; and hiding the information box, if receiving a click operation outside the information box. Steps 201-204 of the invention provide a simplified display method. In order to provide description information of the specified mode to the user, the information box including description information of the specified mode is displayed, when displaying a tips button on the current page of the browser. The information box can be displayed for a predetermined period of time and then the information box is hidden. For reducing interference to the page browsing process, the information box is hidden when receiving a click operation outside the information box, so that the information box can be hidden in time when the user learns the description information.

Preferably, if the tips button is clicked, it can trigger again the display of the information box; and the information box keeps visible until the cursor is moved out of the tips button.

Figure 4:
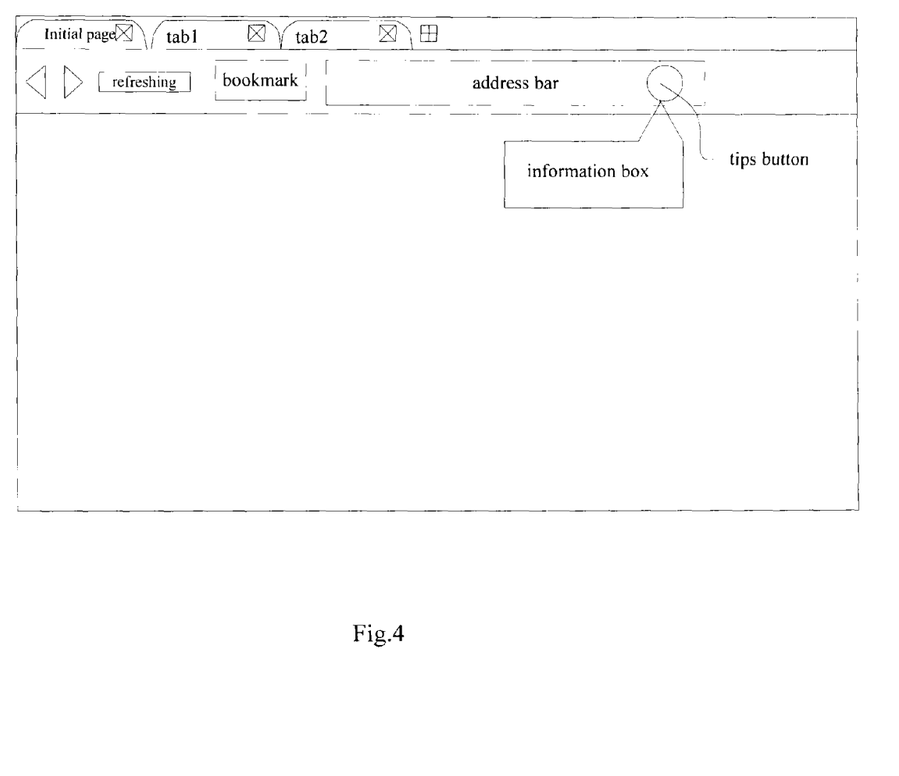
FIG. 4 is a schematic diagram of an interface according to another exemplary embodiment of the present invention.

FIG. 4 is a schematic diagram of an interface according to an exemplary embodiment of the present invention. As shown in FIG. 4, the information box can be located under the tips button. It should be noted that the shape and location of the information box, shown in FIG. 4, are only examples. The information box can also have other shapes, for example, rectangular or triangular, and can be located at any other position of the page, for example, on the top of the tips button. Further, the tips button can also be a webpage link that contains description information. Thereby, when the user wishes to learn other content, he can find associated pages through the webpage link.

Steps 204 and 205 are the process of displaying a tips button on the current page of the browser, if the page browsing mode is changed to a specified mode, including: displaying the tips button on the current page of the browser and providing tips through a pop-up control, if the page browsing mode of the browser is changed to the specified mode for the first time. Preferably, the pop-up control is a Toast tips control.

Figure 5:
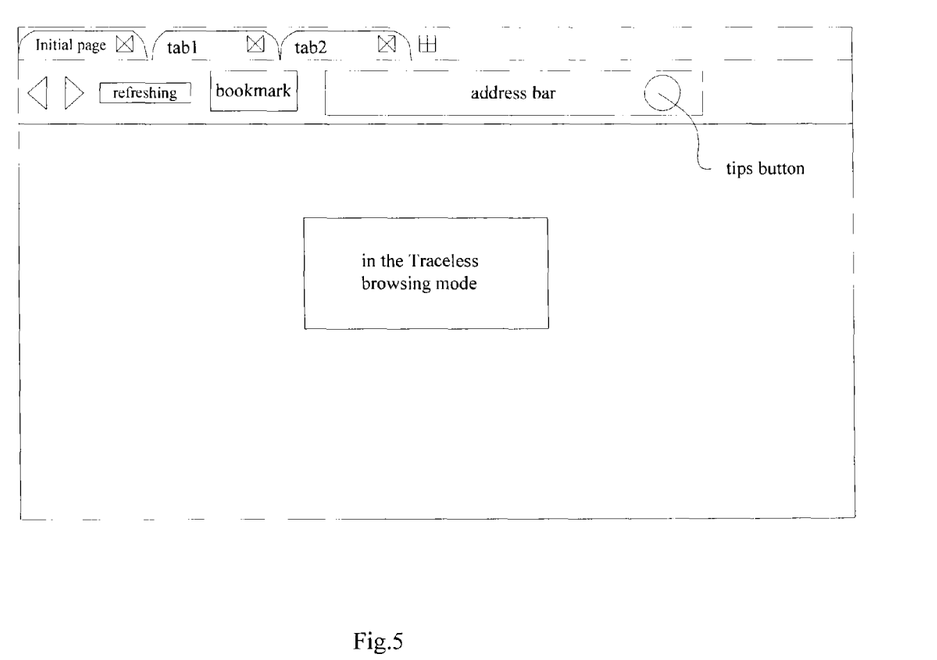
FIG. 5 is a schematic diagram of an interface according to another exemplary embodiment of the present invention.

FIG. 5 is a schematic diagram of an interface according to an exemplary embodiment of the present invention. As shown in FIG. 5, the position for the tips of the pop-up control can be located at the center of the page. It should be noted that the shape and location of the pop-up control, shown in FIG. 5, are only examples. The pop-up control can also have other shapes, for example, rectangular or triangular, and can be located any other position of the page, for example, at the bottom right or bottom left and so on. Further, the pop-up control can also be a webpage link that contains description information. Thereby, when the user wishes to learn other content, he can find associated pages through the webpage link.

It should be noted that the various tips buttons described above can be display as one button, and the modes and security of the page can be distinguished according to its shape and/or color. Alternatively, these buttons can be separated from each other and their shapes, colors and positions can be set or adjusted by the technical staff in the development.

In the above embodiments, both the traceless browsing mode and the security browsing mode are taken as the examples of the specified mode. The specified mode may also include privacy protection browsing mode. The specified mode can be set or adjusted by the technical staff in the development. The specified mode can also be set or adjusted by the user in the course of use. It may be appreciated by the skilled in the art that the name of the browsing mode requiring tips may be different for different browser.

It should be noted that both the traceless browsing mode and the security browsing mode are taken as the examples of the specified mode. In some embodiments, the specified mode includes only one of the traceless browsing mode and the security browsing mode. In some other embodiments, the specified mode includes three or more types.

According to the page display method of exemplary embodiments of the present invention, it is to monitor the page browsing mode of a browser while running the browser, determine a changed page browsing mode, if the page browsing mode of the browser is changed, and display a tips button on the current page of the browser, if the changed page browsing mode is a specified mode. Thereby, the tips-making process while switching modes is simplified. The tips button is displayed on a specific location to remind users, without breaking the continuous browsing via the browser, so that non-trace switch can be achieved when the browser changes its page browsing mode.

Figure 6:
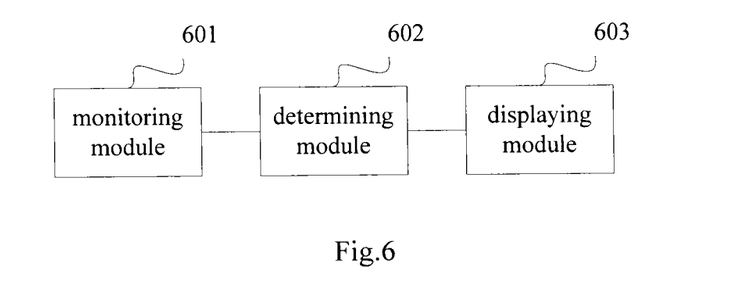
FIG. 6 illustrates the structure of the page display apparatus according to an exemplary embodiment of the present invention.

FIG. 6 illustrates the structure of the page display apparatus according to an exemplary embodiment of the present invention. As shown in FIG. 6, the apparatus includes:

monitoring module 601 for monitoring the page browsing mode of a browser while running the browser;

determining module 602 for determining a changed page browsing mode, if the page browsing mode of the browser is changed; and displaying module 603 for displaying a tips button on the current page of the browser, if the determining module determines the page browsing mode of the browser is changed to a specified mode.

In this embodiment, the monitoring is implemented by monitoring the plug-in associated with the page browsing mode. There is a variety of plug-ins associated with the page browsing mode. In this embodiment, a traceless browsing mode plug-in and a security browsing mode plug-in are taken as examples of the plug-ins.

Optionally, the specified mode includes, for example, a traceless browsing mode or a security browsing mode. The displaying module 603 includes:

a first displaying unit for displaying a tips button for the traceless browsing mode on the current page of the browser, if the changed page browsing mode is the traceless browsing mode; and a second displaying unit for displaying a tips button for the current page on the current page of the browser according to the current page of the browser and the browsing rule of the security browsing mode, if the changed page browsing mode is the security browsing mode.

If it is monitored that the traceless browsing mode plug-in is activated, that is to say, the page browsing mode of the browser is changed to the traceless browsing mode, the first displaying unit displays the tips button for the traceless browsing mode on the current page of the browser. The tips button can also have other shapes for example rectangular or triangular, and can be located outside the address bar, for example, at the bottom right or bottom left corner of the browser and so on.

Furthermore, the tips button can also provide other tips information, such as "in the traceless browsing mode" so that users can learn the current browsing mode.

Optionally, the second displaying unit includes:

a judging unit for judging whether the web address of the current page is in a blacklist or a whitelist of the browsing rule according to the browsing rule of the security browsing mode, if the changed page browsing mode is the security browsing mode;

a displaying sun-unit, for displaying a tips button for representing security on the current page of the browser, if the web address of the current page is in the whitelist of the browsing rule; displaying a tips button for representing insecurity on the current page of the browser, if the web address of the current page is in the blacklist of the browsing rule; and displaying a tips button for representing unknown security on the current page of the browser, if the web address of the current page is neither in the blacklist of the browsing rule nor in the whitelist of the browsing rule.

If it is monitored that the security browsing mode plug-in is activated, that is to say, the page browsing mode of the browser is changed to the security browsing mode, the tips button for the current page is displayed on the current page of the browser according to the current page of the browser and the browsing rule of the security browsing mode. Specifically, the browsing rule of the security browsing mode includes a blacklist and a whitelist. The blacklist includes unsafe websites to prompt not to browse. The whitelist includes safe websites to prompt it is safe to browse. It is to determine whether the web address of the current page is in a blacklist or a whitelist of the browsing rule according to the browsing rule of the security browsing mode, if the page browsing mode of the browser is changed to the security browsing mode; a tips button for representing security is displayed on the current page of the browser, if the web address of the current page is in the whitelist of the browsing rule; a tips button for representing insecurity is displayed on the current page of the browser, if the web address of the current page is in the blacklist of the browsing rule; and a tips button for representing unknown security is displayed on the current page of the browser, if the web address of the current page is neither in the blacklist of the browsing rule nor in the whitelist of the browsing rule.

It should be noted that the tips button for representing security of the page, the tips button for representing insecurity of the page and the tips button for representing unknown security of the page can be the same, except their color. For example, the tips button for representing security of the page may be green, the tips button for representing insecurity of the page may be red, and the tips button for representing unknown security of the page may be yellow. Of course, each button can also have other color.

It should be noted that, since the traceless browsing mode and the security browsing mode can co-exist, the page browsing mode of the browser is changed to the traceless browsing mode and the security browsing mode if the monitoring module 601 monitored that both the traceless browsing mode plug-in and the security browsing mode plug-in are activated.

Optionally, the displaying module 603 is further configured to: display a information box including description information of the specified mode, when displaying a tips button on the current page of the browser; and hide the information box, if receiving a click operation outside the information box. In order to provide description information of the specified mode to the user, the information box including description information of the specified mode is displayed, when displaying a tips button on the current page of the browser. The information box can be displayed for a predetermined period of time and then the information box is hidden. For reducing interference to the page browsing process, the information box is hidden when receiving a click operation outside the information box, so that the information box can be hidden in time when the user learns the description information.

Preferably, if the tips button is clicked, it can trigger again the display of the information box; and the information box keeps visible until the cursor is moved out of the tips button.

The information box can also have other shapes for example rectangular or triangular, and can be located any other position of the page, for example, on the top of the tips button. Further, the tips button can also be a webpage link that contains description information. Thereby, when the user wishes to learn other content, he can find associated pages through the webpage link.

Optionally, the displaying module 603 is further configured to display the tips button on the current page of the browser and providing tips through a pop-up control, if the page browsing mode of the browser is changed to the specified mode for the first time. Preferably, the pop-up control is a Toast tips control. The pop-up control can also have other shapes for example rectangular or triangular, and can be located any other position of the page, for example, at the bottom right or bottom left and so on. Further, the pop-up control can also be a webpage link that contains description information. Thereby, when the user wishes to learn other content, he can find associated pages through the webpage link.

It should be noted that both the traceless browsing mode and the security browsing mode are taken as the examples of the specified mode. In some embodiments, the specified mode includes only one of the traceless browsing mode and the security browsing mode. In some other embodiments, the specified mode includes three or more types.

According to the page display apparatus of exemplary embodiments of the present invention, it is to monitor the page browsing mode of a browser while running the browser, determine a changed page browsing mode, if the page browsing mode of the browser is changed, and display a tips button on the current page of the browser, if the changed page browsing mode is a specified mode. Thereby, the tips-making process while switching modes is simplified. The tips button is displayed on a specific location to remind users, without breaking the continuous browsing via the browser, so that non-trace switch can be achieved when the browser changes its page browsing mode.

It should be noted that the page display apparatus of the above-described embodiments is divided according to the function modules while displaying pages. These functions can also be achieved by different function module as desirable. That is to say, the structure of the apparatus can be divided into different function modules to implement all or parts of the above-described functions. The page display apparatus and the page display method are of the same concept.

Figure 7:
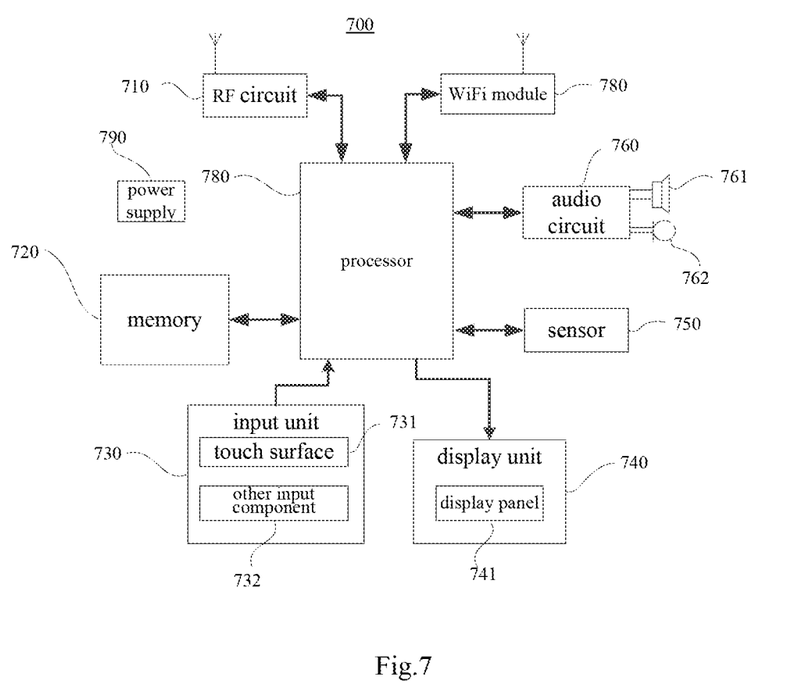
FIG. 7 illustrates the structure of the terminal according to an exemplary embodiment of the present invention.

FIG. 7 illustrates the structure of the terminal according to an exemplary embodiment of the present invention. The terminal may be configured to implement the above described page display method.

The terminal 700 comprises a RF (Radio Frequency) circuit 710, a memory 720 with one or more computer readable storage media, an input unit 730, a display unit 740, a sensor 750, an audio circuit 760, a short-range wireless transmission module 780, a processor 780 with one or more processing cores, and a power supply 790 and so on. The skilled will appreciate that, the structure of the terminal in FIG. 7 does not constitute a limitation on the terminal, and the terminal may include more or fewer components than shown, or combination of some of the components or different component arrangement.

The RF circuit 710 may be used to receive and send information or signals. In particular, the RF circuit 710 transmits the received downlink message from the base station to one or more processors 780. Further, the RF circuit 710 transmits the uplink data to the base station. Typically, the RF circuit 710 includes, but not limited to, at least one amplifier, an antenna, a tuner, one or more oscillators, a subscriber identity module (SIM) card, a transceiver, a coupler, a low noise amplifier (LNA), a diplexer and so on. In addition, the RF circuit 710 may communicate with networks and other devices by wireless communication. The wireless communication may use any communication standard or protocol, including, but not limited to, Global System of Mobile communication (GSM), General Packet Radio Service (GPRS), Code Division Multiple Access (CDMA), Wideband Code Division Multiple Access (WCDMA), Long Term Evolution (LTE), email, Short Messaging Service (SMS) and the like.

Memory 720 can be used to store software programs and modules. For example, memory 720 can be used to store voice signal acquisition software program, keyword recognition software programs, continuous speech recognition software program and reminder realization software program, etc. The processor 780 may run software programs and modules in memory 720 to perform various functions and data processing. The memory 720 may mainly include a program storage area and a data storage area. The program storage area may store an operating system, at least one application required for the functions (such as sound play, image play, etc.). The data storage area may store the data created by the use of the terminal 700 (such as audio data, phone book, etc.). Furthermore, memory 720 may include high-speed random access memory or non-volatile memory, such as at least one of disk storage, flash memory, or other volatile solid-state memory. Accordingly, the memory 720 may also include a memory controller so that the processor 780 and the input unit 730 may accesses the memory 720.

The input unit 730 may receive number or character information, and generate keyboard, mouse, joystick, optical or trackball signal input associated with user settings and function control. Specifically, the input unit 730 may include a touch surface 731, and other input components 732. Touch surface 731, also known as touch screen or touch panel, can collect user operation on or near the touch panel (such as the user operations on or near the touch surface 731 using a finger, stylus, and any other suitable object or accessories), and drive corresponding components according to a preset program. Alternatively, the touch surface 731 may include a touch detector and a touch controller. Wherein the touch detector detects the touch position of the user, creates detection signals caused by the touch operation, and transmits the signals to the touch controller. The touch controller receives touch information from the touch detector, converts it into contact coordinates, and sends the coordinates to the processor 780. The touch controller also receives commands from the processor 780.

Further, the touch surface 731 can be resistive, capacitive, infrared and surface acoustic wave, etc. In addition to the touch surface 731, the input unit 730 may also include other input components 732. Specifically, the other input components 732 may include, but are not limited to, one or more of the physical keyboard, function keys (such as volume control keys, key switches, etc.), a trackball, a mouse, an operating lever or others.

The display unit 740 may display information input by the user or information provided to the user, as well as various graphical user interfaces of the terminal 700. The graphical user interface may consist of graphics, text, icons, video, and any combination thereof. The display unit 740 includes a display panel 741 which may includes, for example, a liquid crystal display (LCD), an organic light emitting diode (OLED). Further, the touch surface 731 may be positioned on the display panel 741. When the touch surface 731 detects touch operations on or near it, it will notify the processor 780 to determine the type of the touch event. Then the processor 780 provides visual output on the display panel 741 according to the touch event type. Although in FIG. 7, two separate components of the touch surface 731 and the display panel 741 are used to achieve the function of input and output, but in some embodiments, the touch surface 731 may be integrated with the display panel 741 to achieve the function of input and output.

The terminal 700 may further include at least one sensor 750, such as light sensors, motion sensors and other sensors. Specifically, the optical sensor may include an ambient light sensor and/or a proximity sensor. The ambient light sensor may adjust the brightness of the display panel 741 according to the brightness of ambient light, and the proximity sensor may close the display panel 741 and/or backlight when the terminal 700 is moved close to the ear. As a motion sensor, the acceleration sensor can detect the magnitude of acceleration in each direction (typically axis) and detect the magnitude and direction of gravity when stationary, to identify the phone posture applications (such as horizontal and vertical screen switching, games, magnetometer calibration) and identify relevant vibration function (such as a pedometer, percussion) and the like. The terminal 700 can also include other sensors, such as a gyroscope, a barometer, a hygrometer, a thermometer, or an infrared sensor.

The audio circuit 760, speaker 761 and microphone 762 can provide an audio interface between the user and the terminal 700. The audio circuitry 1060 may convert received audio data into electrical signal, and transmit the electrical signal to the speaker 761. The speaker 761 can convert the electrical signal to sound signal. On the other hand, the microphone 762 can convert received sound signal into an electric signal, which is received by the audio circuit 760. The audio circuit 760 can convert the received electric signal into audio data and transmit the audio data to the processor 1080. The processor 780 can process the audio data and transmit processed audio data to the RF circuit 710. Finally, the audio data may be transmitted to another terminal or the audio data may be output to the memory 720. The audio circuitry 760 may also include an earbud jack to provide communication between the peripherals earphone and the terminal 700.

The short-range wireless transmission module 780 may include Wireless Fidelity (WiFi) module or Bluetooth module and so on. The terminal 700 can help users through the short-range wireless transmission module 780 to send and receive email, browse the web and access streaming media etc. It provides users with wireless broadband Internet access. Although FIG. 7 shows the short-range wireless transmission module 780, it should be understood that the terminal 700 may or may not include the short-range wireless transmission module 780.

The processor 780 is the control center of the terminal 700. It can use a variety of interfaces and lines for connecting various parts of the terminal, run or execute software program and/or modules stored in the memory 720, and call data stored in the memory 720, so as to perform various functions and data processing and monitor the terminal 700. Alternatively, the processor 780 may include one or more processing units. Preferably, the processor 780 may be integrated with the application processor and the modem processor. The application processor mainly copes with operating system, user interfaces and applications and so on. The modem processor mainly copes with wireless communication. It should be understood that the modem processor may also not be integrated with the processor 780.

The terminal 700 also includes a power supply 790 (such as batteries) providing power to other parts. Preferably, the power supply is logically connected to the processor 780 through a power management system to achieve charging management, discharging management and power management. The power supply 790 may also include one or more AC or DC supply, a recharging system, a power failure detection circuit, a power converter or inverter, a power status indicator and so on.

Although not shown, the terminal 700 may also include a camera, a Bluetooth module, and so on. In the above embodiments, the display unit of the terminal 700 is a touch screen display.

The terminal 700 further includes a memory, and one or more programs. The one or more programs are stored in the memory and configured to be executed by one or more processors. The instructions contained in the one or more programs is used to perform page display methods, such as the page display method shown in FIG. 1 or FIG. 2 according to embodiments of the invention.

At another aspect, a further embodiment of the present invention provides a computer-readable storage medium. The computer-readable storage medium may be contained in the memory of the above embodiment or may be individual medium which is not fitted into a terminal or a server. One or more programs are stored in the computer-readable storage medium and configured to be executed by one or more processors to perform page display methods. The instructions contained in the one or more programs is used to perform page display methods, such as the page display method shown in FIG. 1 or FIG. 2 according to embodiments of the invention.

It should be understood that herein, although the terms first, second, etc. are used to describe various elements, these elements should not be limited by these terms. These terms are only used to distinguish one element from another. It should also be understood that as used herein, unless the context clearly supports exceptions, the singular forms "a", "an", and "the" are intended to include the plural forms. It should also be appreciated that "and/or" includes any and all possible combinations of one or more of associated items.

Further, the skill in the art could understand that all or part of the steps of the above-described method embodiments may be implemented by hardware or program instruction relevant hardware. The corresponding program may be stored in a computer readable storage medium. The storage medium may be a read-only memory, magnetic or optical disks and so on.

The above described embodiments are merely preferred embodiments of the invention, but not intended to limit the invention. Any modifications, equivalent alternations and improvements that are made within the spirit and scope of the invention should be included in the protection scope of the invention.

What is claimed is:

1. A page display method, comprising:
monitoring a page browsing mode of a browser while running the browser;
determining a changed page browsing mode, if the page browsing mode of the browser is changed;
displaying a tips button on a current page of the browser, if the changed page browsing mode is a specified mode, to indicate that the current page is in the specified mode;
displaying an information box including description information of the specified mode, when the tips button is clicked on the current page of the browser; and
hiding the information box, when receiving a click operation outside the information box or after the information box has been displayed for a predetermined period of time,
wherein the tips button is displayed in an address bar within the current page of the browser.

2. The method of claim 1, wherein, the specified mode comprises a traceless browsing mode and a security browsing mode, and the step of displaying a tips button on a current page of the browser comprises:
displaying a traceless browsing mode related tips button on the current page of the browser, if the changed page browsing mode is the traceless browsing mode; and
displaying a current page related tips button on the current page of the browser according to the current page of the browser and a browsing rule of the security browsing mode, if the changed page browsing mode is the security browsing mode.

3. The method of claim 2, wherein the step of displaying a current page related tips button on the current page of the browser comprises:
judging whether a web address of the current page is in a blacklist or a whitelist of the browsing rule according to the browsing rule of the security browsing mode, if the changed page browsing mode is the security browsing mode;
displaying a security tips button for representing security on the current page of the browser, if the web address of the current page is in the whitelist of the browsing rule;
displaying a insecurity tips button for representing insecurity on the current page of the browser, if the web address of the current page is in the blacklist of the browsing rule; and
displaying a unknown security tips button for representing unknown security on the current page of the browser, if the web address of the current page is neither in the blacklist of the browsing rule nor in the whitelist of the browsing rule.

4. The method of claim 1, wherein the step of displaying a tips button on a current page of the browser comprises:
displaying the tips button on the current page of the browser and providing tips through a pop-up control, if the page browsing mode of the browser is changed to the specified mode for the first time.

5. A terminal device, comprising:
a memory; and
a processor, configured to execute a program stored in the memory, wherein the program comprises instructions used to perform the following operations:
monitoring a page browsing mode of a browser while running the browser;
determining a changed page browsing mode, if the page browsing mode of the browser is changed;
displaying a tips button on a current page of the browser, if the changed page browsing mode is a specified mode, to indicate that the current page is in the specified mode;
displaying an information box including description information of the specified mode, when the tips button is clicked on the current page of the browser; and
hiding the information box, when receiving a click operation outside the information box or after the information box has been displayed for a predetermined period of time,
wherein the tips button is displayed in an address bar within the current page of the browser.

6. The terminal device of claim 5, wherein, the specified mode comprises a traceless browsing mode and a security browsing mode, and the operation of displaying a tips button on a current page of the browser comprises:
displaying a traceless browsing mode related tips button on the current page of the browser, if the changed page browsing mode is the traceless browsing mode; and
displaying a current page related tips button on the current page of the browser according to the current page of the browser and a browsing rule of the security browsing mode, if the changed page browsing mode is the security browsing mode.

7. The terminal device of claim 6, wherein the operation of displaying a current page related tips button on the current page of the browser comprises:

judging whether a web address of the current page is in a blacklist or a whitelist of the browsing rule according to the browsing rule of the security browsing mode, if the changed page browsing mode is the security browsing mode;

displaying a security tips button for representing security on the current page of the browser, if the web address of the current page is in the whitelist of the browsing rule;

displaying a insecurity tips button for representing insecurity on the current page of the browser, if the web address of the current page is in the blacklist of the browsing rule; and displaying a unknown security tips button for representing unknown security on the current page of the browser, if the web address of the current page is neither in the blacklist of the browsing rule nor in the whitelist of the browsing rule.

8. The terminal device of claim 5, wherein the operation of displaying a tips button on a current page of the browser comprises:

displaying the tips button on the current page of the browser and providing tips through a pop-up control, if the page browsing mode of the browser is changed to the specified mode for the first time.

\* \* \* \* \*